US012791986B2

(12) United States Patent
Fuller et al.

(10) Patent No.: US 12,791,986 B2
(45) Date of Patent: Nov. 10, 2026

(54) PRODUCT IDENTIFICATION SYSTEM AND METHOD

(71) Applicant: INTELLIGRATED HEADQUARTERS, LLC, Mason, OH (US)

(72) Inventors: Kent Fuller, West Chester, OH (US); Brian D. Hysell, Loveland, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 419 days.

(21) Appl. No.: 18/462,973

(22) Filed: Sep. 7, 2023

(65) Prior Publication Data

US 2024/0103447 A1 Mar. 28, 2024

Related U.S. Application Data

(63) Continuation of application No. 16/657,800, filed on Oct. 18, 2019, now Pat. No. 11,789,410.

(60) Provisional application No. 62/747,871, filed on Oct. 19, 2018.

(51) Int. Cl.
*G01K 11/06* (2006.01)
*G04F 1/00* (2006.01)
*G04F 13/04* (2006.01)

(52) U.S. Cl.
CPC ................ *G04F 1/00* (2013.01); *G01K 11/06* (2013.01); *G04F 13/04* (2013.01)

(58) Field of Classification Search
None
See application file for complete search history.

(56) References Cited

U.S. PATENT DOCUMENTS

| | | | | |
|---|---|---|---|---|
| 7,860,277 | B2 | 12/2010 | Mulder et al. | |
| 9,412,099 | B1 | 8/2016 | Tyree | |
| 10,040,628 | B1 | 8/2018 | Misra et al. | |
| 2007/0246328 | A1 * | 10/2007 | Reznik .................. | B65G 43/10 198/444 |
| 2015/0242918 | A1 | 8/2015 | Mccarthy | |
| 2015/0294260 | A1 | 10/2015 | Napoli | |
| 2018/0068266 | A1 | 3/2018 | Kirmani et al. | |
| 2018/0085788 | A1 * | 3/2018 | Engel ...................... | B07C 1/025 |
| 2018/0169858 | A1 | 6/2018 | Jain et al. | |
| 2018/0174101 | A1 | 6/2018 | Mattingly et al. | |

(Continued)

OTHER PUBLICATIONS

Examiner Interview Summary Record (PTOL-413) Mailed on Jun. 7, 2023 for U.S. Appl. No. 16/657,800, 1 page(s).

(Continued)

*Primary Examiner* — Erica S Lin
(74) *Attorney, Agent, or Firm* — Alston & Bird LLP

(57) ABSTRACT

Methods, apparatuses, and systems for identifying and tracking products in a material handling system and/or for identifying and handling product defects in a material handling system are provided. An example method may include receiving one or more articles in the material handling system; capturing one or more images of the one or more articles; identifying at least one visual defect indicator on at least one article of the one or more articles; and determining an indication corresponding to at least one of a defect of the at least one article or a portion of the material handling system causing the defect.

14 Claims, 8 Drawing Sheets

(56) References Cited

U.S. PATENT DOCUMENTS

2020/0124484 A1 4/2020 Fuller et al.

OTHER PUBLICATIONS

Final Rejection Mailed on Mar. 7, 2023 for U.S. Appl. No. 16/657,800.
Non-Final Office Action Mailed on Sep. 28, 2022 for U.S. Appl. No. 16/657,800.
Notice of Allowance and Fees Due (PTOL-85) Mailed on Jun. 7, 2023 for U.S. Appl. No. 16/657,800, 10 page(s).
Notice of Allowance and Fees Due (PTOL-85) Mailed on Jun. 16, 2023 for U.S. Appl. No. 16/657,800, 4 page(s).
Office Action Appendix Mailed on Jun. 7, 2023 for U.S. Appl. No. 16/657,800, 4 page(s).
U.S. Appl. No. 16/657,800, filed Oct. 18, 2019, U.S. Pat. No. 11,789,410, Patented.

* cited by examiner

PRODUCT IDENTIFICATION SYSTEM AND METHOD

CROSS-REFERENCE TO RELATED APPLICATION

The present application is a continuation of U.S. Non-Provisional application Ser. No. 16/657,800, filed Oct. 18, 2019, which claims priority to and benefit of U.S. Patent Application No. 62/747,871, filed on Oct. 19, 2018, each of which is incorporated herein by reference into the present application.

TECHNOLOGICAL FIELD

Example embodiments of the present invention relate generally to methods and apparatuses associated with a material handling system.

BACKGROUND

Product identification schemes are essential components of high-volume distribution and fulfillment operations. Generally, a distribution center may receive a large number of diverse products for handling and/or storing. Identifying and tracking of these products (including those that may be damaged or deformed while in transit within the distribution center) throughout the handling and/or storage operation may be essential to maximize accuracy and efficiency of the distribution center. However, existing methods and systems fail to provide an accurate and effective way of identifying and tracking these products.

BRIEF SUMMARY

The following presents a simplified summary to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

According to at least one aspect of the present disclosure, a method is provided. The method may include receiving the one or more articles in the material handling system; capturing one or more images of the one or more articles; identifying, based at least on the one or more images, at least one visual defect indicator on at least one article of the one or more articles; and determining, based at least on the at least one visual defect indicator, an indication corresponding to at least one of a defect of the at least one article or a portion of the material handling system causing the defect.

According to one or more embodiments of the present disclosure, identifying the at least one visual defect indicator may comprise: comparing a first image of the at least one article at a first portion of the material handling system with a second image of the at least one article at a second portion of the material handling system; identifying one or more differences between the first image and the second image; and classifying the one or more differences as the at least one visual defect indicator based at least on one or more preexisting defect templates.

According to one or more embodiments of the present disclosure, the method may further comprise identifying at least a portion between the first portion and the second portion as the portion of the material handling system causing the defect.

According to one or more embodiments of the present disclosure, identifying the at least one visual defect indicator may comprise processing the one or more images to detect one or more preexisting indicia placed on the at least one article.

According to one or more embodiments of the present disclosure, the method may further comprise modifying, based on the indication, at least one system variable associated with the material handling system.

According to one or more embodiments of the present disclosure, the at least one system variable may be associated with the portion of the material handling system causing the defect.

According to one or more embodiments of the present disclosure, the at least one system variable may comprise at least one merge variable associated with a merge portion of the material handling system.

According to one or more embodiments of the present disclosure, the method may further comprise determining, based on the indication, at least a sortation destination associated with the at least one article. In some examples, the sortation destination associated with the at least one article is different from at least one sortation destination associated with other articles of the one or more articles.

According to at least another aspect of the present disclosure, an apparatus is provided. The apparatus may comprise at least one processor and at least one non-transitory memory comprising program code. The at least one non-transitory memory and the program code may be configured to, with the at least one processor, cause the apparatus to at least: cause a material handling system to receive one or more articles; cause capturing of one or more images of the one or more articles; identify, based at least on the one or more images, at least one visual defect indicator on at least one article of the one or more articles; and determine, based at least on the at least one visual defect indicator, an indication corresponding to at least one of a defect of the at least one article or a portion of the material handling system causing the defect.

According to at least another aspect of the present disclosure, a computer program product is provided. The computer program product may comprise at least one non-transitory computer-readable storage medium having computer-readable program code portions stored therein. The computer-readable program code portions may comprise an executable portion configured to: cause a material handling system to receive one or more articles; cause capturing of one or more images of the one or more articles; identify, based at least on the one or more images, at least one visual defect indicator on at least one article of the one or more articles; and determine, based at least on the at least one visual defect indicator, an indication corresponding to at least one of a defect of the at least one article or a portion of the material handling system causing the defect.

According to at least another aspect of the present disclosure, a method for tracking one or more articles in a material handling system is provided. The method may include receiving at least one article on an induction portion of the material handling system; capturing, by a vision system of the material handling system, one or more images of the at least one article; identifying, by a central controller communicably coupled to the vision system, at least one unique characteristic of the at least one article from the one or more images captured by the vision system; and associating, by the central controller, the at least one unique characteristic of the at least one article with a unique product identifier (UPID) for the at least one article.

According to one or more embodiments of the present disclosure, the method may include tracking the at least one article through the material handling system using the UPID.

According to one or more embodiments of the present disclosure, identifying the at least one unique characteristic may include processing the one or more images captured by the vision system to detect one or more visual identifiers present on the at least one article.

According to one or more embodiments of the present disclosure, identifying the at least one unique characteristic may include processing the one or more images captured by the vision system to detect at least one preexisting indicia placed on the at least one article.

According to one or more embodiments of the present disclosure, associating the at least one unique characteristic of the at least one article with the UPID may include the central controller comparing the at least one unique characteristic with one or more preexisting images comprising unique characteristics data, stored in a database associated with the central controller; identifying at least one preexisting image comprising unique characteristics data corresponding to the at least one unique characteristic; determining a UPID, stored in the database, associated with the preexisting image; and associating the UPID with the at least one unique characteristic of the at least one article.

According to another aspect of the present disclosure, a material handling system for handling one or more articles received on the material handling system is provided. The material handling system may include a central controller, and a vision system communicably coupled to the central controller. The vision system may include one or more cameras for capturing one or more images of at least one article of the one or more articles. The central controller may identify at least one unique characteristic of the at least one article from the one or more images captured by the vision system, and may associate the at least one unique characteristic with a unique product identifier (UPID) for the at least one article.

According to one or more embodiments of the present disclosure, the controller may further determine one or more product parameters associated with the at least one article based on the UPID, and adjust at least one system variable associated with the material handling system based on the one or more product parameters.

According to another aspect of the present disclosure, a method for operating a merge in a material handling system is provided. The method may include receiving at least one article on an induction portion of the material handling system. The induction portion may be downstream of the merge.

The method may include capturing, by a vision system of the material handling system, one or more images of the at least one article; identifying, by a central controller communicably coupled to the vision system and the merge, at least one unique characteristic of the at least one article from the one or more images captured by the vision system; associating, by the central controller, the at least one unique characteristic of the at least one article with a unique product identifier (UPID) for the at least one article; determining, by the central controller, one or more product parameters associated with the at least one article based on the UPID; and adjusting, by the central controller, at least one merge variable associated with the merge based on the one or more product parameters.

According to another aspect of the present disclosure, a method for operating a sorter in a material handling system is provided. The method may include receiving at least one article on an induction portion of the material handling system. The induction portion may be upstream of the sorter.

The method may include capturing, by a vision system of the material handling system, one or more images of the at least one article; identifying, by a central controller communicably coupled to the vision system and the sorter, at least one unique characteristic of the at least one article from the one or more images captured by the vision system; associating, by the central controller, the at least one unique characteristic of the at least one article with a unique product identifier (UPID) for the at least one article; determining, by the central controller, one or more product parameters associated with the at least one article based on the UPID; and determining, by the central controller, at least a sortation destination associated with the at least one article based on the one or more product parameters.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
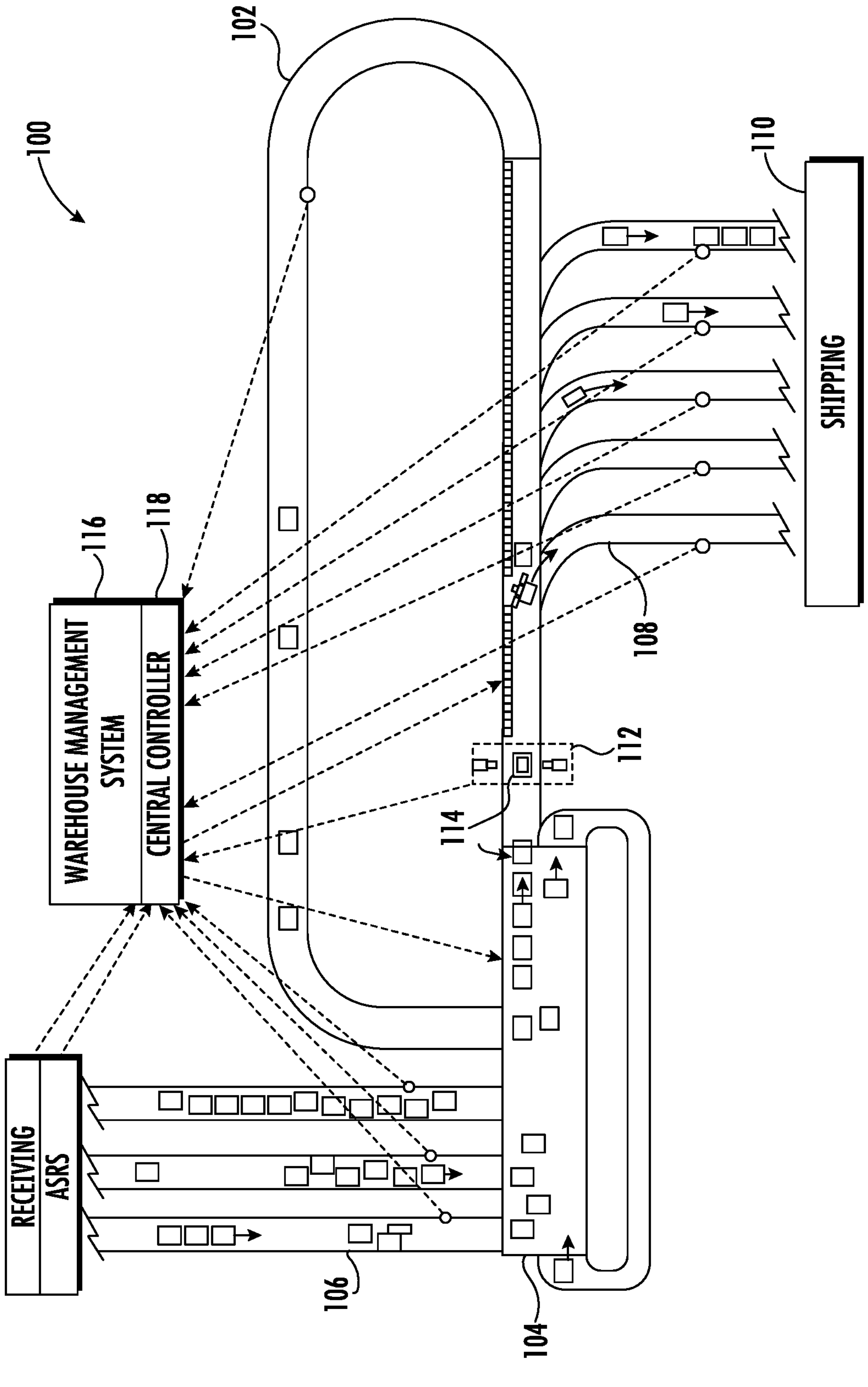
FIG. 1 illustrates a perspective view of a material handling system in accordance with one or more embodiments of the present disclosure.

Some embodiments of the present invention will now be described more fully hereinafter with reference to the accompanying drawings, in which some, but not all, embodiments of the inventions are shown. Indeed, the disclosure may be embodied in many different forms and should not be construed as limited to the embodiments set forth herein; rather, these embodiments are provided so that this disclosure will satisfy applicable legal requirements.

The terms "or" and "optionally" are used herein in both alternative and conjunctive sense, unless otherwise indicated.

The word "example" or "exemplary" is used herein to mean "serving as an example, instance, or illustration." Any implementation described herein as "example" or "exemplary" is not necessarily to be construed as preferred or advantageous over other implementations.

If the specification states a component or feature "may," "can," "could," "should," "would," "preferably," "possibly," "typically," "optionally," "for example," "in some examples," "often," or "might" (or other such language) be included or have a characteristic, that a specific component or feature is not required to be included or to have the characteristic. Such component or feature may be optionally included in some embodiments, or it may be excluded.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

In many distribution and fulfillment (D&F) centers, products may be received into a material handling system for handling. These products may arrive in manufacturer's corrugated paper boxes. The boxes may be unloaded from a container and received into the material handling system (often stored) and then shipped back out to form orders for individuals or stores. To process the boxes, indicia (such as a Universal Products Code (UPC) printed on the box at the time of manufacture) may be read. When combined with product manifest from that container, a Warehouse Management System (WMS) may identify the individual boxes of product and may generate a Unique License Plate Barcode (ULPB). This label may be printed and then applied to each box. The barcode may be an adhesive label, which may contain a unique barcode that may allow an automated Warehouse Control System (WCS) to track and sort the product to the correct destination based on scan points using barcode readers.

However, print and apply label applicators may be a severe bottleneck to the throughput of a system. They may require substantial capital and maintenance, expensive labels, expensive barcode readers, and may be difficult to implement. In addition, the labels may fall off, get smeared or damaged, resulting in poor read rates at the scan points, and therefore may require human interaction (and significant labor) to address the no-read condition.

In addition, challenges exist in identifying and sorting articles that have been damaged or deformed in the D&F centers. For example, a product may be damaged at jam points, due to colliding with other products or load shifting, by failing belts or rollers, and/or the like.

In accordance with the present disclosure, the material handling system may utilize one or more cameras and a database of product images to uniquely identify products. Identification of the product using cameras at typical system speed may eliminate the requirement to print and apply a separate tracking label as well as all of the hardware required to read barcodes. For increased accuracy, the system may also read the manufacturer's UPC barcode on the product (if viewable) to ensure accurate identification. As such, the disclosed system may eliminate the requirement for barcode reading tunnels at induction, as well as Print and Apply systems to apply Unique License Plate Barcode labels.

Further, in accordance with the present disclosure, the material handling system may utilize the one or more cameras to identify potential damage or defect on the products. Based on the identified damage or defect, a portion of the material handling system that causes the damage or defect may be determined, and system variables may be adjusted to eliminate further damage on the products.

FIG. 1 illustrates an example perspective view of an example material handling system 100 in accordance with one or more embodiments of the present disclosure.

In some examples, the example material handling system 100 may include a sorter portion 102 for selectively identifying, sorting and/or diverting one or more articles 114 to one of the destinations 108, such as, but not limited to, takeaway conveyors, chutes, and the like. In some examples, the diverted articles may be sent to shipping 110 for shipping to a destination, for example, a store. While the example as shown in FIG. 1 may illustrate a paddle sorter, it is noted that the scope of the present disclosure is not limited to a paddle sorter. In some examples, other types of sorter(s) may be implemented, including, but not limited to, pusher/puller sorters, pop-up transfer sorters, and/or cross-belt sorters.

In some examples, the sorter portion 102 may receive the one or more articles 114 from an induction portion 104 of the example material handling system 100, which may be positioned upstream of the sorter portion 102. In some examples, the induction portion 104 may be configured to generate spacing between the one or more articles 114, such that each of the one or more articles 114 may be separately sorted by the sorter portion 102. For example, the induction portion 104 may comprise different types and/or configurations of belt units, which may create the required spacing between the one or more articles 114.

In some examples, the induction portion 104 may receive articles 114 from a merge portion 106, as shown in FIG. 1. The merge portion 106 may have multiple accumulation lanes and/or conveyors for releasing articles in a slug and/or zipper fashion onto the induction portion 104. In some examples, the merge portion 106 may receive the one or more articles from a receiving system and/or an automated storage and retrieval system (ASRS). Additionally, or alternatively, the merge portion 106 may receive the one or more articles from other sources.

In the example as shown in FIG. 1, the example material handling system 100 may include a vision system 112 having one or more cameras for capturing one or more images of the one or more articles 114 moving from the induction portion 104 towards the sorter portion 102. In some examples, the one or more cameras may be configured to capture one or more still images and/or video images of the one or more articles 114.

Additionally, or alternatively, the vision system 112 (and/or another vision system) may be located at different position(s) than as shown in FIG. 1 so that one or more cameras may capture one or more images of the one or more articles 114 moving in the induction portion 104. Additionally, or alternatively, the vision system 112 (and/or another vision system) may be located at different position(s) than as shown in FIG. 1 so that one or more cameras may capture one or more images of the one or more articles 114 moving in the sorter portion 102. Additionally, or alternatively, the vision system 112 (and/or another vision system) may be located at different position(s) than as shown in FIG. 1 so that one or more cameras may capture one or more images of the one or more articles 114 moving in the merge portion 106.

In some examples, one or more components of the example material handling system 100, such as, but not limited to, the sorter portion 102, the induction portion 104, the merge portion 106, the vision system 112, and/or the like, may be communicably coupled to at least one of a warehouse management system 116 and/or a central controller 118. The term "communicably coupled" refers to two or more components (for example, but not limited to, the sorter portion 102, the induction portion 104, the merge portion 106, the vision system 112, the warehouse management system 116 and the central controller 118 as shown in FIG. 1) being connected through wired means (for example but not limited to, wired Ethernet) and/or wireless means (for example but not limited to, Wi-Fi, Bluetooth, ZigBee), such that data and/or information may be transmitted to and/or received from these components.

In some examples, the warehouse management system 116 and/or the central controller 118 may adjust, modify, and/or control a set of system variables for the example material handling system 100. The term "system variables" refers to parameters associated with the operation of a material handling system. Example system variables may include, but not limited to, speed commands (e.g., conveyor speed, merge speed, sortation speed, etc.), recirculation commands, sortation commands (e.g., destination implementation, divert commands, etc.), shut-down commands, accumulation controls, discharge controls, induction controls, chute actuation, and sensor (e.g., photoeyes) inputs/outputs. For example, system variables associated with the sorter portion 102 may include, but not limited to, speed commands, recirculation commands, chute actuation, and/or sortation commands described above. As another example, system variables associated with the induction portion 104 may include, but not limited to, speed commands, accumulation controls, and/or induction controls described above. As another example, system variables associated with the merge portion 106 may include, but not limited to, speed commands and/or discharge controls described above.

Referring to FIG. 1, images and data captured and recorded by the vision system 112 may be utilized to ascertain system performance. The vision system 112 may recognize defects in the articles, and may generate an alarm if product is being damaged by the system at jam points, failing belts or rollers, etc. The system may provide statistics to drive operational decisions based on "visible" product data including (but not limited to) defect rate, color, branding, dimensions, volume, etc. Example details of which are described herein.

Figure 2:
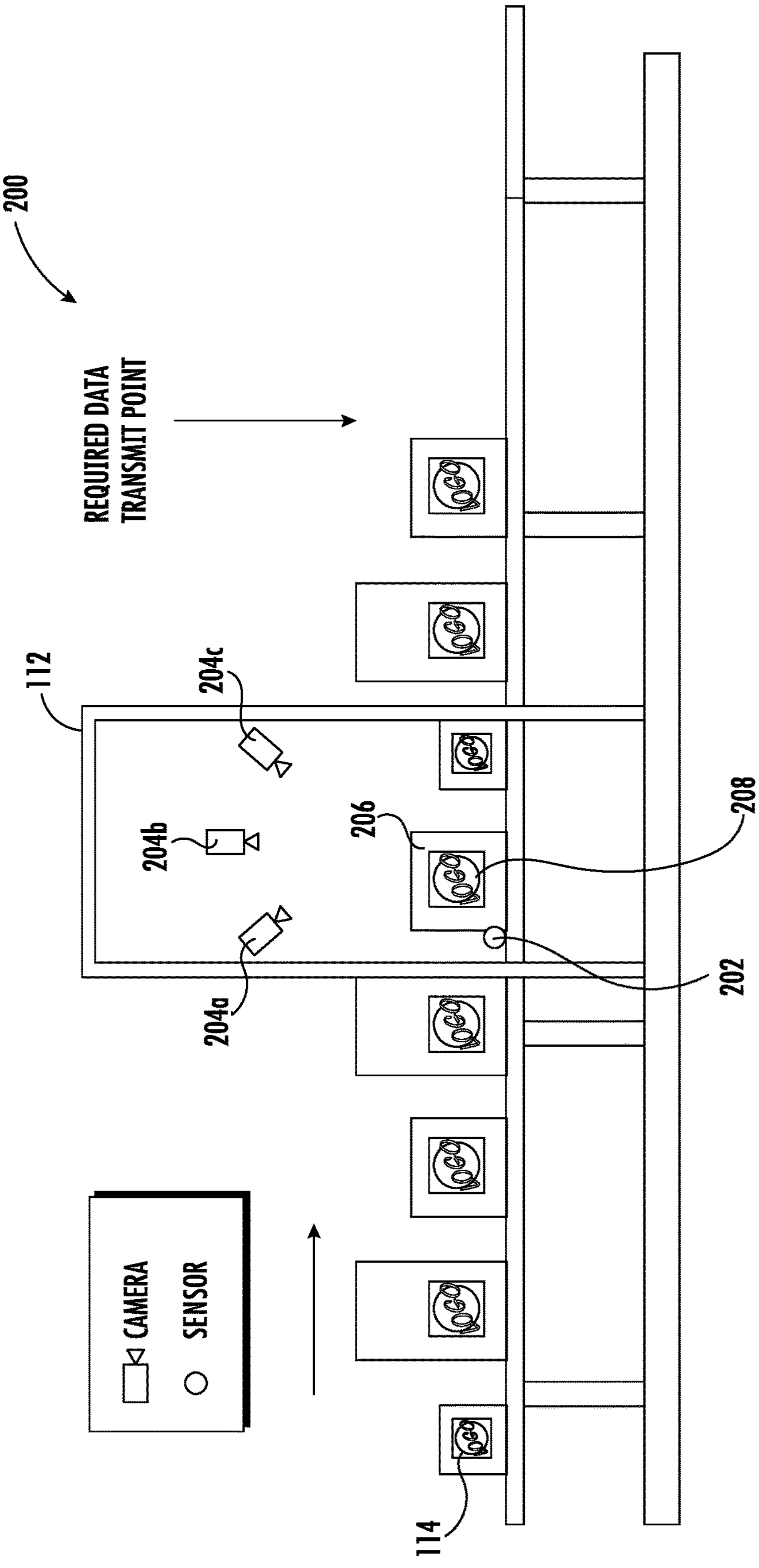
FIG. 2 illustrates a perspective view of a portion of the material handling system in accordance with an embodiment of the present disclosure.

FIG. 2 illustrates an example perspective view of a portion 200 of the example material handling system 100, in accordance with one or more embodiments of the present disclosure.

In the example as shown in FIG. 2, one or more articles 114 may be placed on a conveyor, and may be conveyed in a conveyance direction towards the vision system 112. In some examples, the conveyor speed may be 600 feet per minute. In some examples, other conveyor speed may be used. As shown in FIG. 2, there may be spacing between the one or more articles 114. In some examples, the spacing may be 6 inches between each article. In some examples, other length of spacing may be used.

The vision system 112 may include one or more cameras, such as cameras 204*a*, 204*b*, and 204*c* as shown. In some examples, each of cameras 204*a*, 204*b*, and 204*c* may be arranged to capture one or more images of an article 206 present in a field of view of the cameras 204*a*, 204*b*, and 204*c*, such that the cameras 204*a*, 204*b*, and 204*c* may capture images of the article 206 from different angles and/or directions. For example, the vision system 112 may capture one to six sides of the article 206. In some examples, the one or more images captured by the cameras 204*a*, 204*b*, and/or 204*c* may include still images and/or video images.

While the example as shown in FIG. 2 illustrates three cameras, it is noted that the scope of the present disclosure is not limited to three cameras. It is to be appreciated that, less than three cameras, more than three cameras, and/or additional or alternative image capturing devices are within the scope of the present disclosure.

In some examples, capturing of images by the vision system 112 may be triggered in response to detecting that an article 206 is entering a scan zone of the vision system 112. For example, in an embodiment, a sensor 202 (such as but not limited to, a photo eye) may be placed at an entry of the scan zone. Thus, when the article 206 passes through the sensor 202, the sensor 202 may detect the presence of the article 206 and may trigger image capturing and/or scanning operation of one or more of the cameras 204*a*, 204*b*, and/or 204*c*. In an embodiment, the sensor 202 and the vision system 112 may be communicably coupled to and controlled by the central controller 118.

In some examples, the article 206 may include one or more unique characteristics 208, such as, but not limited to, unique brand logos, specific alphanumeric text specific to the product, and the like. The unique characteristic 208 may include any visually identifiable and unique symbol, data, picture, characteristic, etc. that may be associated to the article 206. In accordance with the embodiments of the present disclosure, the vision system 112 and/or the central controller 118 may identify at least one unique characteristic 208 of the article 206 by processing one or more images of the article 206 captured by the cameras 204*a*, 204*b*, and/or 204*c*. For example, typical images will contain unique brand logos, specific alphanumeric text specific to the product, and/or other information.

In some examples, the unique characteristic 208 may include preexisting indicia. For example, an example preexisting indicia may be a manufacturer's barcode placed on the article 206. If the vision system 112 and/or the central controller 118 identifies a manufacturer barcode printed on the article 206, the vision system 112 and/or the central controller 118 may process the barcode, compare it with known product barcodes stored in a database associated with the central controller 118. In some examples, for any articles that may have no barcode or unique images, a preprinted product barcode may be applied (for example, at the time of the product entering the induction portion of the material handling system). In these examples, the vision system 112 may identify and detect the barcode as the unique characteristic 208 of the article 206.

Figure 3:
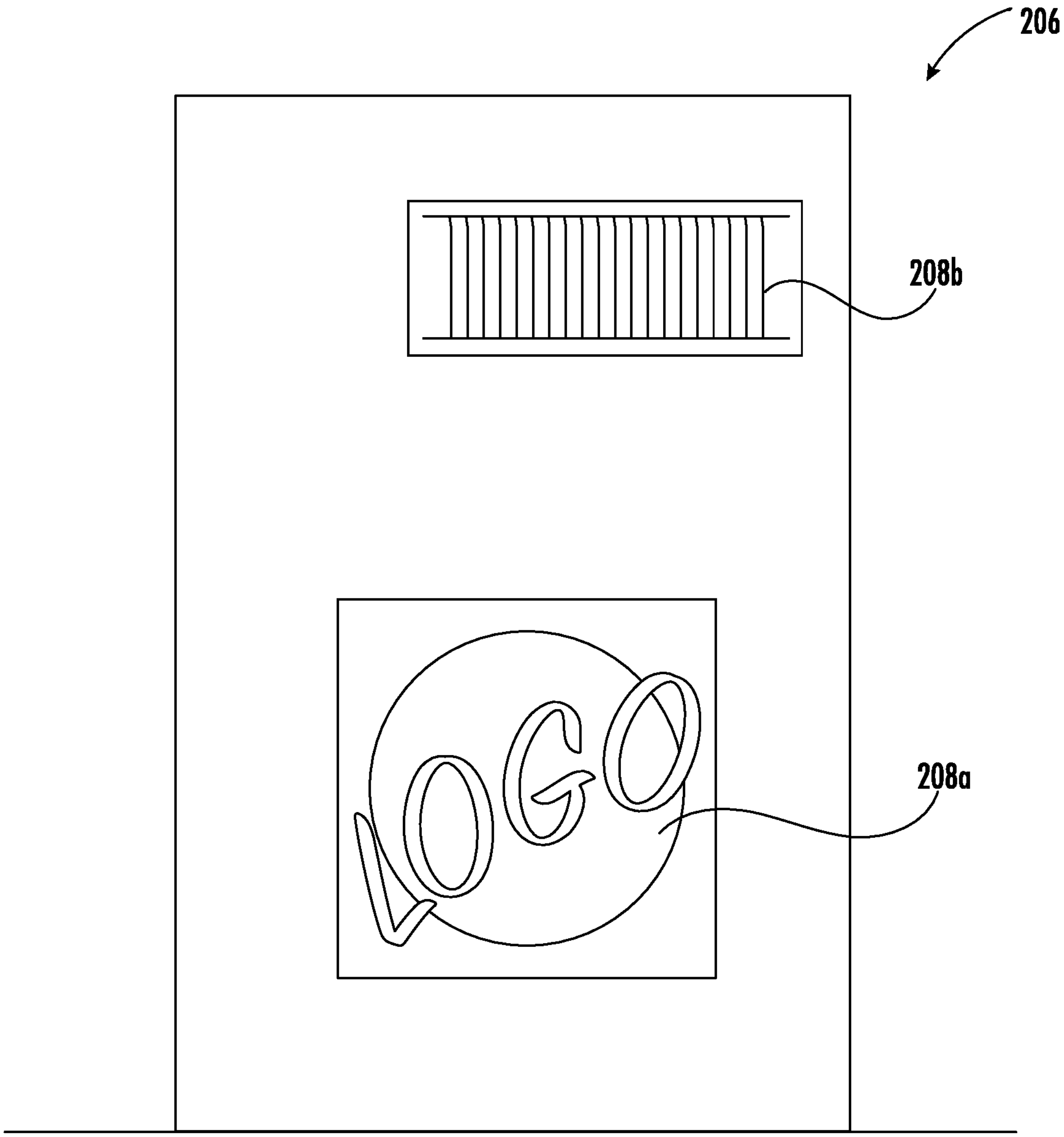
FIG. 3 illustrates a perspective view of an article in accordance with an embodiment of the present disclosure.

For example, referring to FIG. 3, an example perspective view of the article 206 in accordance with one or more embodiments of the present disclosure is illustrated. The article 206 may comprise one or more unique characteristics, such as but not limited to, a first unique characteristic 208*a* and a second unique characteristic 208*b*. For example, the first unique characteristic 208*a* may include a brand logo and the second unique characteristic 208*b* may include a preexisting barcode.

Referring back to FIG. 2, in some examples, the distance between the product induction point (i.e. the sensor 202) and the required data transmit point (e.g. when the article may reach the first divert in the sorter portion 102) may be determined and/or adjusted based on the image processing speed of the images captured by the vision system. For example, the faster the image processing speed, the faster that articles 114 may be identified and tracked, and the shorter the distance is required. In some examples, the distance may be 1.6 feet. In some examples, other distances may be used. Additional details are described in connection with at least FIG. 5.

Figure 4:
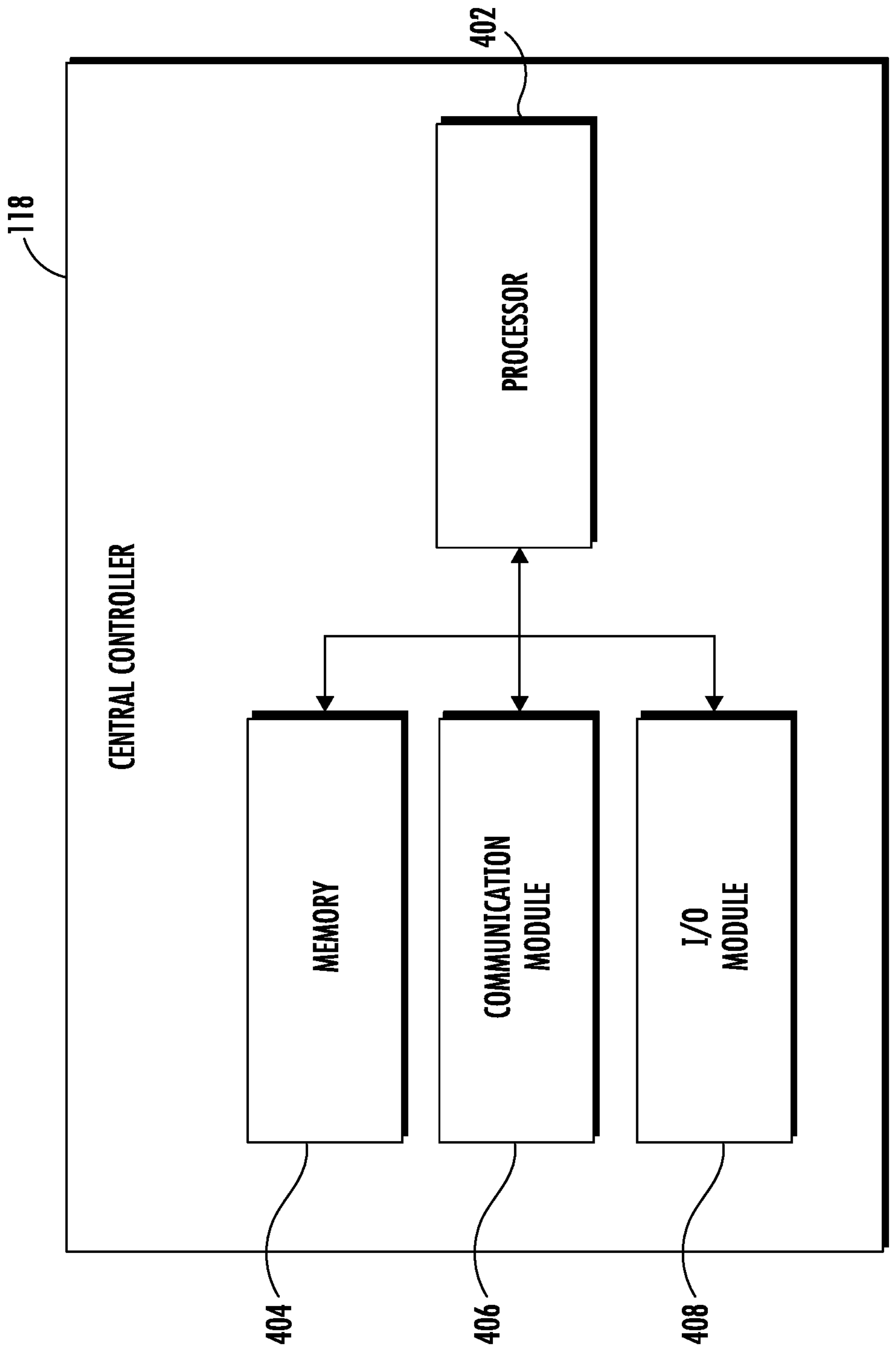
FIG. 4 illustrates a schematic block diagram of a central controller in accordance with one or more embodiments of the present disclosure.

FIG. 4 illustrates an example schematic block diagram of a central controller 118 for controlling the operation of the example material handling system 100 in accordance with one or more embodiments of the present disclosure. The central controller 118 may include at least a processor 402, a memory 404, a communication module 406, and an input/output module 408 as shown in FIG. 4.

In some examples, the processor 402 may be configured (with processor executable instructions) to perform operations described herein. The processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), and/or some combination thereof. Accordingly, although illustrated in FIG. 4 as a single processor, in some embodiments, the processor 402 may comprise a plurality of processors. The plurality of processors may be embodied on a single device or may be distributed across a plurality of devices. The plurality of processors may be in operative communication with each other, and may be collectively configured to perform one or more functionalities of the central controller 118 as described herein. In an example embodiment, the processor 402 may be configured to execute instructions stored in the memory 404 or otherwise accessible to the processor 402. These instructions, when executed by the processor 402, may cause the central controller 118 to perform one or more of the functionalities of the central controller 118, as will be described with reference to at least FIGS. 5-8.

In some examples, the memory 404 may comprise, for example, volatile memory, non-volatile memory, or some combination thereof. Although illustrated in FIG. 4 as a single memory, the memory 404 may comprise a plurality of memory components. The plurality of memory components may be embodied on a single device or distributed across a plurality of devices. In various embodiments, the memory 404 may comprise, for example, a hard disk, random access memory, cache memory, read only memory (ROM), erasable programmable read-only memory (EPROM) and electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. The memory 404 may be configured to store information, data (including item data and/or profile data), applications, instructions, or the like for enabling central controller 118 to carry out various functions in accordance with example embodiments of the present invention. For example, in at least some embodiments, the memory 404 may buffer input data for processing by the processor 402. Additionally, or alternatively, in at least some embodiments, the memory 404 may store program instructions for execution by the processor 402. The memory 404 may store information in the form of static and/or dynamic information. This information may be stored and/or used by the central controller 118 at least during the course of performing its functionalities.

In an embodiment, the memory 404 (and/or an external data storage device) may include a database of product images stored in a system training phase, known preexisting product barcodes, brand logos, and other similar visual identifiers. For example, the database may correlate the visual identifiers to a unique product identifier (UPID), as described herein. In an embodiment, the database of customer product may be built for the system to use during operation. This database may be unique to each customer, and/or may be applicable to multiple sites within that customer network.

In an embodiment, the memory 404 (and/or an external data storage device) may store preexisting defect templates. In some examples, the processor 402 may retrieve the preexisting defect templates to identify visual defect indicators from images, details of which are described herein.

The communication module 406 may be embodied as any device or means embodied in circuitry, hardware, a computer program product comprising computer readable program instructions stored on a computer readable medium (e.g., the memory 404) and executed by a processing device (e.g., the processor 402), or a combination thereof that is configured to receive and/or transmit data from/to another device and/or network. In some embodiments, the communication module 406 (like other components discussed herein) can be at least partially embodied as or otherwise controlled by the processor 402. In this regard, the communication module 406 may be in communication with the processor 402, such as via a bus. The communication module 406 may include, for example, an antenna, a transmitter, a receiver, a transceiver, network interface card and/or supporting hardware and/or firmware/software for enabling communications with another device. The communication module 406 may be configured to receive and/or transmit any data that may be stored by the memory 404 using any protocol that may be used for communications between devices. The communication module 406 may additionally or alternatively be in communication with the memory 404, the input/output module 408 and/or any other component of the central controller 118 via wired and/or wireless means (for example, a system bus).

The input/output module 408 may be in communication with the processor 402 to receive an indication of a user input and/or to provide an audible, visual, mechanical, or other output to a user. For example, the input/output module 408 may include support for a keyboard, a mouse, a joystick, a display, a touch screen display, a microphone, a speaker, a radio-frequency identification (RFID) reader, a barcode reader, a biometric scanner and/or other input/output mechanisms. In examples where the central controller 118 is embodied as a server or database, aspects of input/output module 408 may be reduced as compared to examples where the central controller 118 is implemented as an end-user machine (e.g., remote worker device and/or employee device) or other type of device designed for complex user interactions.

In some examples, the input/output module 408 may be eliminated from the central controller 118 (similar to other components discussed herein). Alternatively, such as in embodiments wherein the central controller 118 is embodied as a server or database, at least some aspects of input/output module 408 may be embodied on an apparatus used by a user that is in communication with the central controller 118. The input/output module 408 may be in communication with the memory 404, the communication module 406, and/or any other component(s) via wired and/or wireless means (such as via a bus). In some examples, more than one input/output module and/or other component may be included in the central controller 118.

The central controller 118 may include an artificial component that uses at least one of artificial intelligence or machine learning to at least one of identify the at least one unique characteristic, associate the at least one unique characteristic with a UPID, and/or identify visual defect indicators. For example, the system may "learn" product as it passes through the vision system, and/or an operator may "teach" the system to build the database of images and corresponding UPID numbers. Once the system has been trained, the database may contain a complete list of product images and corresponding UPID numbers. As another example, the system may "learn" to identify visual defect indicators from images, details of which are described herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash. memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus (such as the processor 402 as discussed above with reference to FIG. 4) to produce a machine, such that the computer program product includes the instructions which execute on the computer or other programmable data processing apparatus create a means for implementing the functions specified in the flowchart block or blocks.

In some examples, these computer program instructions may be stored in a computer-readable storage device (e.g., the memory 404 as discussed above with reference to FIG. 4) that may direct a computer or other programmable data processing apparatus to function in a particular manner, such that the instructions stored in the computer-readable storage device may produce an article of manufacture including computer readable instructions for implementing the function discussed herein. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions, and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Figure 5:
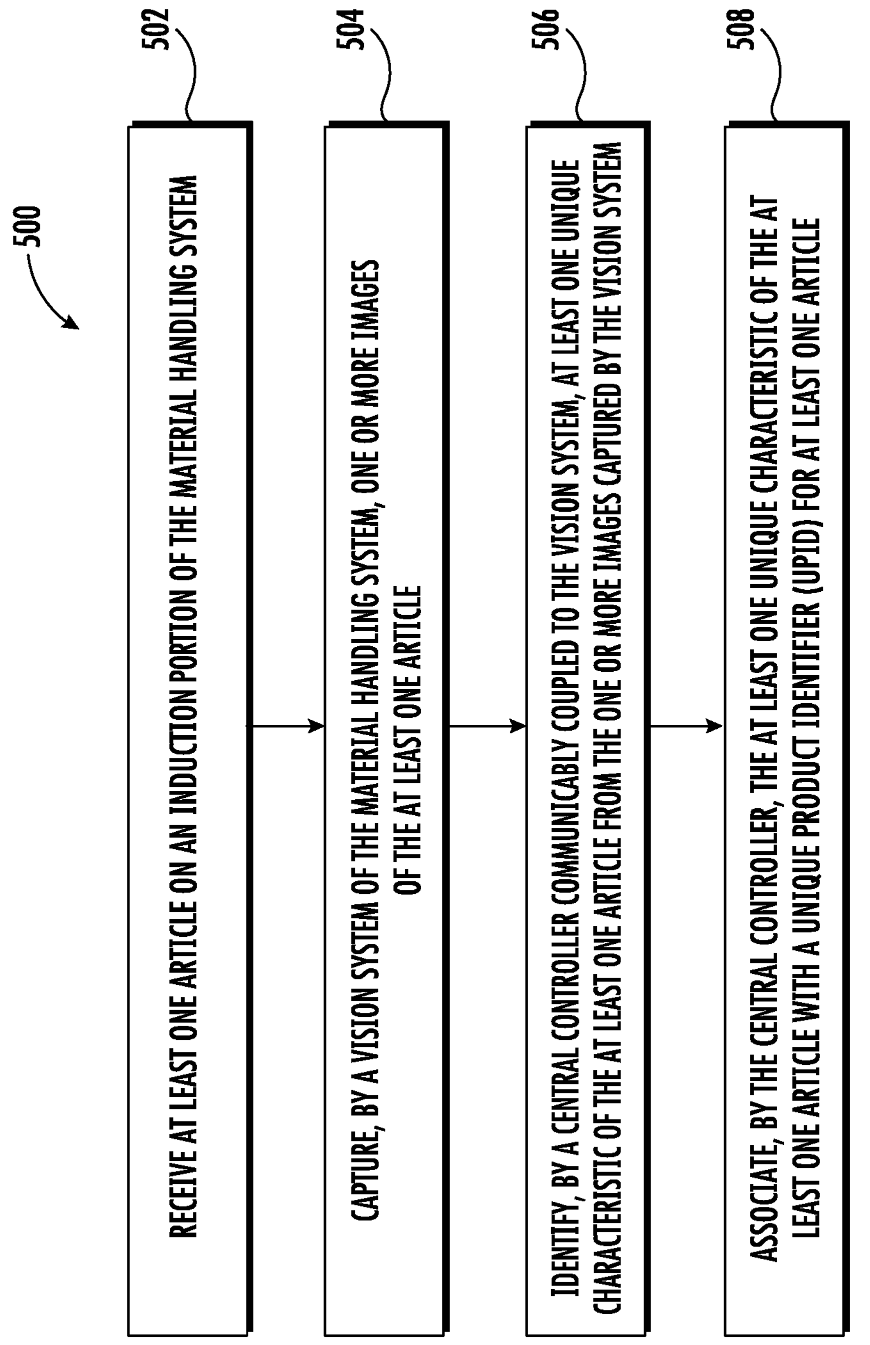
FIG. 5 illustrates an example method for tracking articles in the material handling system in accordance with one or more embodiments of the present disclosure.

FIG. 5 illustrates an example method 500 for tracking one or more articles in an example material handling system (such as, but not limited to, the example material handling system 100 as illustrated in FIG. 1) in accordance with one or more embodiments of the present disclosure.

The method 500 may include receiving at least one article on an induction portion of an example material handling system at block 502. For example, one or more articles 206 may be received on the induction portion 104 of the example material handling system 100 as shown in FIGS. 1 and 2.

The method 500 may include capturing one or more images of the at least one article at block 504. For example, the vision system 112 of the example material handling system 100 may capture one or more images of the at least one article 206 as shown in FIGS. 1 and 2.

The method 500 may include identifying, by an example central controller communicably coupled to an example vision system, at least one unique characteristic of the at least one article from the one or more images at block 506. For example, the central controller 118 and/or vision system 112 may identify at least one unique characteristic 208 of the at least one article 206 from the one or more images captured by the vision system 112 as shown in FIGS. 1 and 2.

In some examples, identifying the at least one unique characteristic may include processing the one or more images captured by the vision system to detect one or more visual identifiers present on the at least one article. In another embodiment, identifying the at least one unique characteristic may include processing the one or more images captured by the vision system to detect at least one preexisting indicia placed on the at least one article.

In some examples, the at least one unique characteristic may be identified based at least on image recognition algorithms. For example, the central controller 118 may implement an image classifier to identify the at least one unique characteristic. Additionally, or alternatively, other image recognition algorithms may be utilized, including, but not limited to, an artificial neural network, deep learning algorithms, and/or the like.

For example, referring back to FIG. 3, the one or more visual identifiers of the article 206 may include at least the first unique characteristic 208*a*, which may be a brand logo. The one or more preexisting indicia placed on the article 206 may include the second unique characteristic 208*b*, which may include a preexisting barcode.

The method 500 may include associating, by the central controller, the at least one unique characteristic of the at least one article with a unique product identifier (UPID) for the at least one article at block 508. For example, the central controller 118 may associate the at least one unique characteristic 208 of the at least one article 206 with a unique product identifier (UPID) for the at least one article 206 as shown in FIGS. 1-2.

In some examples, the central controller may generate a UPID. The term "UPID" may refer to a virtual identifier, such as a product ID number, alphanumeric text, etc., created by an example central controller (such as the central controller 118 as shown in FIG. 1) and/or any associated component of the material handling system (such as the material handling system 100 as shown in FIG. 1) for uniquely identifying and/or tracking each article being handled and/or conveyed in a distribution center by the example material handling system (such as the material handling system 100 as shown in FIG. 1). In some examples, a UPID may be in the form of an American Standard Code for Information Interchange (ASCII) text, a pointer, a memory address, or the like.

In some examples, associating the at least one unique characteristic of the at least one article with the UPID may further include the central controller comparing the at least one unique characteristic with one or more preexisting images comprising unique characteristics data, which may be stored in the database associated with the central controller as described above. In some examples, the central controller may identify at least one preexisting image having unique characteristics data corresponding to the at least one unique characteristic. In some examples, the central controller may determine a UPID (stored in the database) associated with the preexisting image, and may associate the UPID with the at least one unique characteristic of the at least one article.

It should be noted that the processing speed of the images captured by the vision system may be determined and/or adjusted by the central controller, as there may be limited time to capture the images, process them by comparing them to the ones stored in the database, and return a UPID number to the system. In some examples, the WMS may require time to process the UPID and return a sort destination, for example, based on the UPID data. In some examples, destination data must be returned by the time point that the article reaches the first divert (otherwise an error may occur), as discussed above in connection with FIG. 2. In an embodiment, the performance criteria may be a factor of the throughput (articles/minute), conveyor speed (sorter speed), product gap, distance from induction to first divert, time to travel from induction to first divert, central controller lookup time, target image capture and/or processing time, etc. In some examples, the throughput may be 300 cartons per minute, the conveyor speed may be 600 feet per minute, the product gap may be 6 inches, the distance from induction to first divert may be 11.6 feet, the time to travel from induction to first divert may be 1.16 seconds. In some examples, other values of these parameters may be used.

Figure 6:
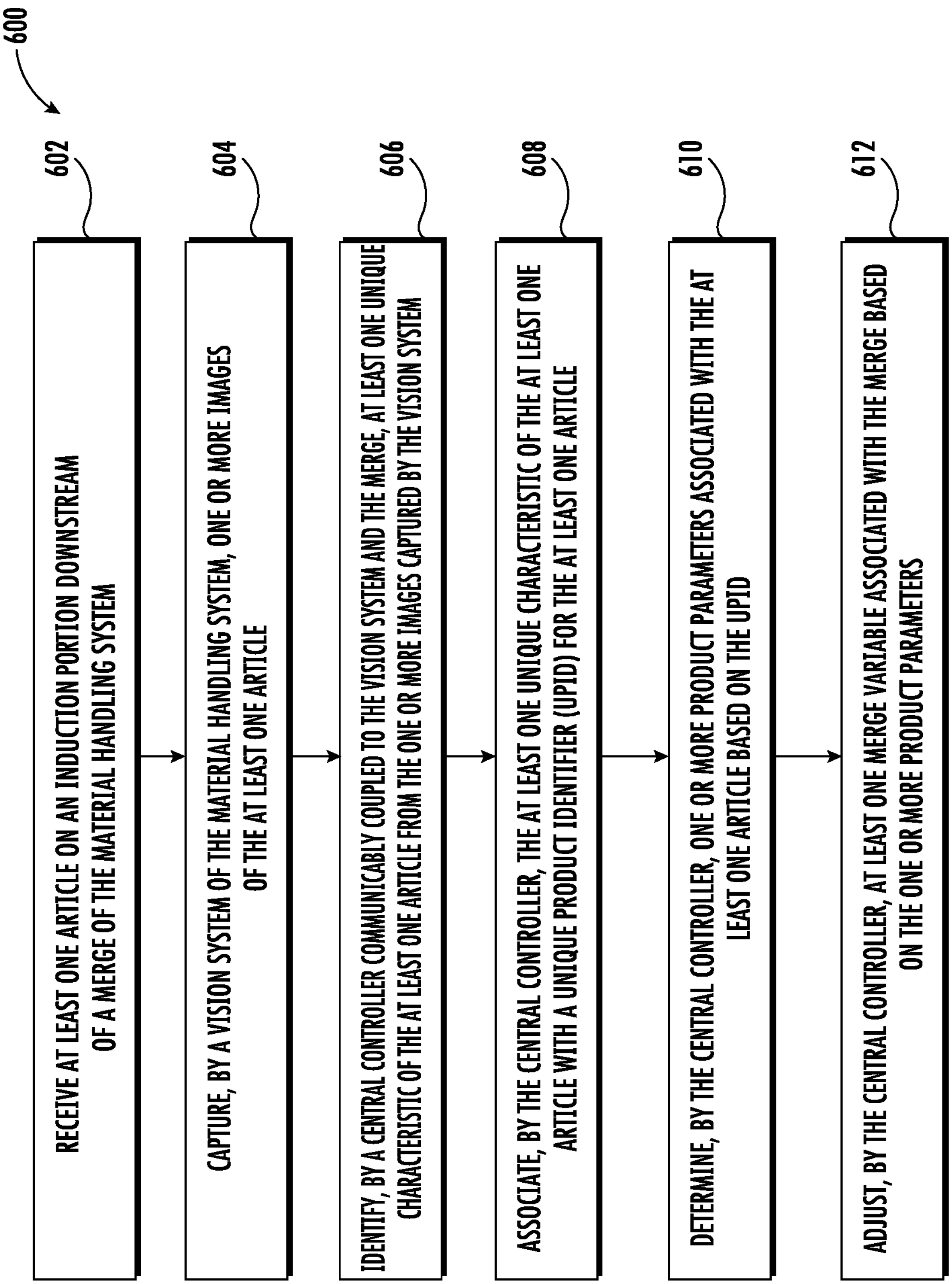
FIG. 6 illustrates an example method for operating a merge in the material handling system in accordance with one or more embodiments of the present disclosure.

FIG. 6 illustrates an example method 600 for operating a merge in an example material handling system (such as, but not limited to, the merge portion 106 in the example material handling system 100 as shown in FIG. 1) in accordance with one or more embodiments of the present disclosure.

The method 600 may include receiving at least one article on the induction portion of the example material handling system at block 602. For example, the one or more articles 206 may be received on the induction portion 104 of the example material handling system 100, as shown in FIGS. 1 and 2.

In some examples, the induction portion may be downstream of the merge portion. For example, as shown in FIG. 1, the induction portion 104 may be downstream of the merge portion 106 in the traveling direction of the articles 114.

The method 600 may include capturing, by an example vision system of the example material handling system, one or more images of the at least one article at block 604. For example, the vision system 112 of the example material handling system 100 may capture one or more images of the at least one article 206 as shown in FIGS. 1-2.

The method 600 may include identifying at least one unique characteristic of at least one article based on the one or more images captured by the vision system at block 606. In some examples, the at least one unique characteristic may be identified by an example central controller communicably coupled to the example vision system and/or the merge. For example, the central controller 118 and/or vision system 112 may identify at least one unique characteristic 208 of the at least one article 206 from the one or more images captured by the vision system 112 as shown in FIGS. 1-2.

In some examples, the at least one unique characteristic may be identified by the central controller similar to those described above in connection with block 506 of FIG. 5.

The method 600 may include associating, by an example central controller, the at least one unique characteristic of the at least one article with a unique product identifier (UPID) for the at least one article at block 608. For example, the central controller 118 may associate the at least one unique characteristic 208 of the at least one article 206 with a unique product identifier (UPID) for the at least one article 206 as shown in FIGS. 1-2.

In some examples, the at least one unique characteristic of at least one article may be associated with the UPID similar to those described above in connection with block 508 of FIG. 5.

The method 600 may include determining, by an example central controller, one or more product parameters associated with the at least one article based on the UPID at block 610. For example, the central controller 118 may determine one or more product parameters associated with the at least one article 206 based on the UPID as shown in FIGS. 1-2.

The term "product parameters" as used herein may refer to characteristic associated with a product, such as, but not limited to, weight, length, width, coefficient of friction, etc. In some examples, the central controller may determine the one or more product parameters from a database that store product parameters associated with products in the material handling system. In some examples, the one or more product parameters may be retrieved from the database based on the UPID.

The method 600 may include adjusting at least one merge variable associated with the merge portion based on the one or more product parameters at block 612. For example, the central controller 118 may adjust at least one merge variable associated with the merge portion 106 based on the one or more product parameters as shown in FIGS. 1-2.

The term "merge variable" as used herein may refer to any system variable associated with a merge portion and/or associated systems (such as the merge portion 106 illustrated above in connection with FIG. 1). For example, merge variable may include product spacing, speed, acceleration, merging mode, etc. associated with the merge portion 106 and/or systems upstream and/or downstream of the merge portion 106. A high-speed merge in a typical D&F system may require product be spaced and optimized to maximize throughput and efficiency into the sortation system. Knowing the specific product details of the incoming upstream product (weight, length, width, coefficient of friction, etc. would allow the system to optimize the carton delivery to ensure product reaches maximum throughput by adjusting merge variables.

Figure 7:
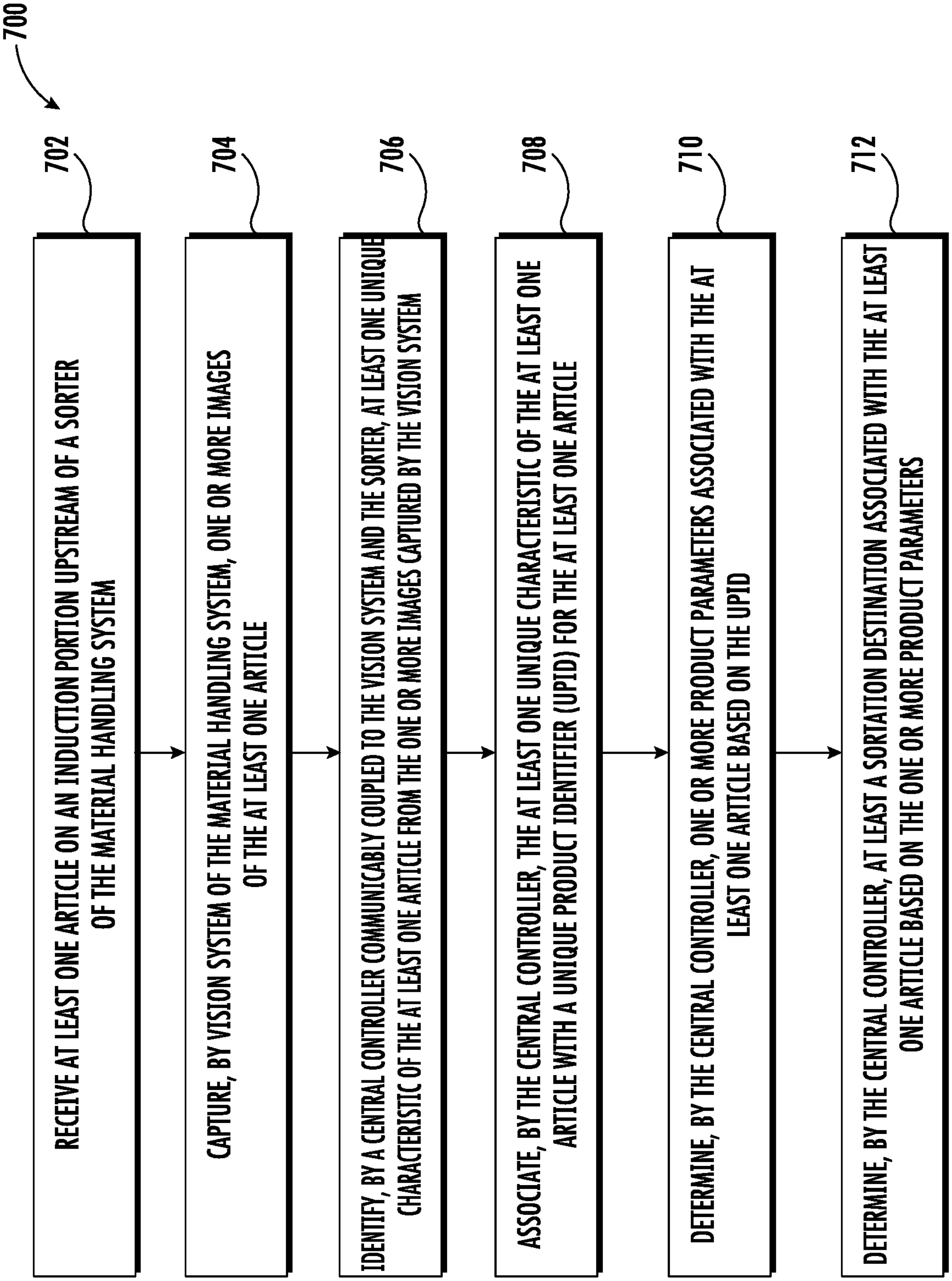
FIG. 7 illustrates an example method for operating a sorter in the material handling system in accordance with one or more embodiments of the present disclosure.

FIG. 7 illustrates an example method 700 for operating a sorter in an example material handling system (such as, but not limited to, the sorter portion 102 in the example material handling system 100 as shown in FIG. 1) in accordance with one or more embodiments of the present disclosure.

The method 700 may include receiving at least one article on an example induction portion of an example material handling system at block 702. For example, at least one article 206 may be received on the induction portion 104 of the example material handling system 100 as shown in FIGS. 1 and 2.

In an embodiment, the induction portion 104 may be upstream of the sorter portion 102. For example, as shown in FIG. 1, the induction portion 104 may be upstream of the sorter portion 102 in the traveling direction of the articles 114.

The method 700 may include capturing, by an example vision system of an example material handling system, one or more images of at least one article at block 704. For example, the vision system 112 of the example material handling system 100 may capture one or more images of the at least one article 206 as shown in FIGS. 1-2.

The method 700 may include identifying, by a central controller and/or a vision system, at least one unique characteristic of at least one article from the one or more images captured by the example vision system at block 706. For example, the central controller 118 and/or the vision system 112 may identify at least one unique characteristic 208 of the at least one article 206 from the one or more images captured by the vision system 112 as shown in FIGS. 1-2.

In some examples, the at least one unique characteristic may be identified by the central controller similar to those described above in connection with block 506 of FIG. 5.

The method 700 may include associating, by an example central controller, the at least one unique characteristic of at least one article with a unique product identifier (UPID) for the at least one article at block 708. For example, the central controller 118 may associate the at least one unique characteristic 208 of the at least one article 206 with a unique product identifier (UPID) for the at least one article 206 as shown in FIGS. 1-2.

In some examples, the at least one unique characteristic of at least one article may be associated with the UPID similar to those described above in connection with block 508 of FIG. 5.

The method 700 may include determining, by an example central controller, one or more product parameters associated with at least one article based on the UPID at block 710. For example, the central controller 118 may determine one or more product parameters associated with the at least one article 206 based on the UPID as shown in FIGS. 1-2.

In some examples, the one or more product parameters may be determined similar to those described above in connection with block 610 of FIG. 6.

The method 700 may include determining, by an example central controller, at least a sortation destination associated with the at least one article based on the one or more product parameters at block 712. For example, the central controller 118 may determine at least a sortation destination associated with the at least one article 206 based on the one or more product parameters as shown in FIGS. 1-2.

In some examples, the sortation destination may be determined by the central controller based at least in part on the UPID of the article. For example, the central controller may retrieve sortation destination parameters from a database based on the UPID, and may adjust the sortation destination of the sorter portion for the article. As an example, the sorter portion 102 may discharge all articles of the same color and/or branding to a specific discharge lane based on the UPID information.

Figure 8:
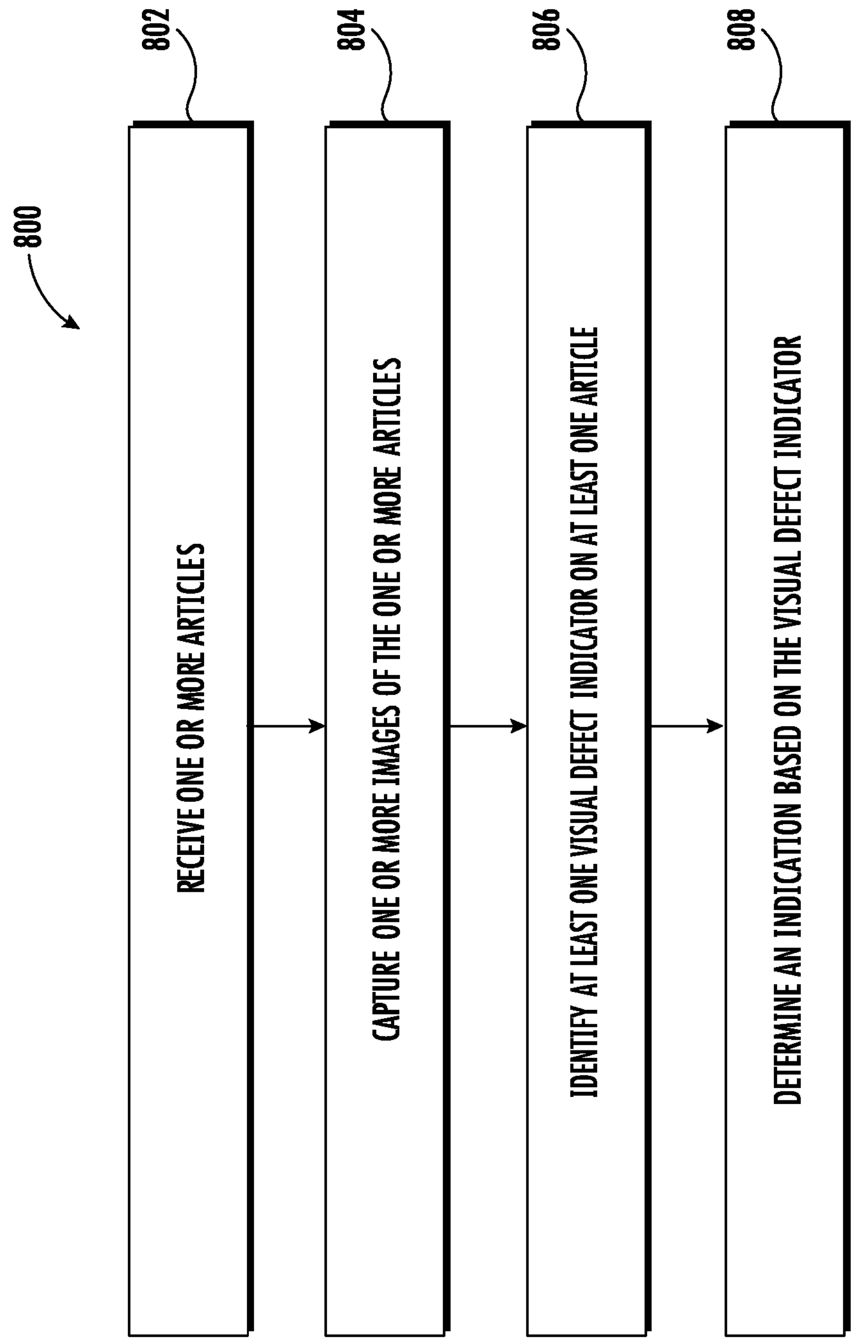
FIG. 8 illustrates an example method for detecting and/or monitoring damages and/or defects in articles in the material handling system in accordance with one or more embodiments of the present disclosure.

FIG. 8 illustrates an example method 800 for detecting, monitoring and/or handling defects and/or damages in one or more articles in an example material handling system (such as, but not limited to, the example material handling system 100 as illustrated in FIG. 1) in accordance with one or more embodiments of the present disclosure.

The method 800 may include receiving one or more articles at block 802.

In some examples, the one or more articles may be received on an example induction portion of an example material handling system. For example, the one or more article 206 may be received on the induction portion 104 of the example material handling system 100 as shown in FIGS. 1 and 2.

Additionally, or alternatively, the one or more articles may be received on one or more portions other than the induction portion of an example material handling system. For example, one or more articles may be received in a sorter portion of the material handling system. As another example, one or more articles may be received in a merge portion of the material handling system.

The method 800 may include capturing one or more images of the one or more articles at block 804. In some examples, the one or more images may be captured by an example vision system of an example material handling system. For example, the vision system 112 of the example material handling system 100 may capture one or more images of the at least one article 206 as shown in FIGS. 1-2.

In some examples, the vision system may capture at least a first image of the at least one article at a first portion of an example material handling system and a second image of the at least one article at a second portion of the example material handling system.

As an example, the first image may be captured at a merge portion of the material handling system (for example, the merge portion 106 of the example material handling system 100 as shown above in connection with FIG. 1), and the second image may be capture at an induction portion of the material handling system (for example, the induction portion 104 as shown above in connection with FIG. 1).

Additionally, or alternatively, the first image may be captured at an induction portion of the material handling system (for example, the induction portion 104 of the example material handling system 100 as shown above in connection with FIG. 1), and the second image may be captured at the sorter portion of the material handling system (for example, the sorter portion 102 as shown above in connection with FIG. 1).

Additionally, or alternatively, the first image may be captured at a merge portion of the material handling system (for example, the merge portion 106 of the example material handling system 100 as shown above in connection with FIG. 1), and the second image may be captured at the sorter portion of the material handling system (for example, the sorter portion 102 as shown above in connection with FIG. 1).

Additionally, or alternatively, the first image and the second image may be captured at different locations in the same portion of the material handling system. For example, the first image and the second image may be captured at different locations of the sorter portion 102 of the example material handling system 100 described above in connection with FIG. 1. As another example, the first image and the second image may be captured at different locations of the induction portion 104 of the example material handling system 100 described above in connection with FIG. 1. As another example, the first image and the second image may be captured at different locations of the merge portion 106 of the example material handling system 100 described above in connection with FIG. 1.

Additionally, or alternatively, the first image and the second image may be captured at the same location/portion of the material handling system but at different times. For example, referring back to FIG. 1, the vision system 112 may capture one or more images of each of the articles 114 as they move within the field of view of the vision system 112.

While the examples illustrated above describe two images being captured by the vision system, it is noted that the scope of the present disclosure is not limited to two images only. In some examples, the vision system may capture less than two or more than two images at the same or different portions of the material handling system.

For example, the vision system may capture a first image at a first portion of the material handling system, a second image at a second portion of the material handling system, and a third image at a third portion of the material handling system. As another example, the vision system may capture a first image at a first location of the material handling system, a second image at a second location of the material handling system, and a third image at a third location of the material handling system. In this example, the first location, the second location, and/or the third location may be associated with the same portion of the material handling system.

As another example, the vision system may capture a first image at a first time, a second image at a second time, and a third image at a third time. In this example, the first image, the second image, and/or the third image may be associated with the same location/portion or different locations/portions of the material handling system.

The method 800 may include identifying at least one visual defect indicator on at least one article of the one or more articles at block 806. In some examples, the at least one visual defect indicator may be identified by an example central controller and/or an example vision system. For example, the central controller 118 and/or vision system 112 may identify at least one visual defect indicator on the at least one article 206 based on the one or more images captured by the vision system 112 as shown in FIGS. 1-2.

In some examples, the at least one visual defect indicator may be identified based on the one or more images captured by the vision system. For example, as described above, the vision system may capture at least a first image at a first portion/location of the material handling system and a second image at a second portion/location of the material handling system. The central controller and/or the vision system may compare the first image with the second image. The central controller may identify one or more differences between the first image and the second image.

For example, referring back to FIG. 1, the central controller 118 may identify at least one unique characteristic associate with each article and/or may associate each article with a unique product identifier as described above. As such, the central controller 118 may track the articles as they move within the example material handling system 100, and may identify each article in the images. For example, the central controller 118 may identify the same article as appearing in different images, and may analyze these images to determine whether there is a difference on the appearance of this article.

In some examples, the central controller and/or the vision system may classify the one or more differences as a visual defect indicator. The term "visual defect indicator" refers to a visual indication that an article may have been damaged, deformed, blemished, and/or not in the desired condition.

In some examples, the visual defect indicator may be classified by the central controller based at least on one or more preexisting defect templates. The term "preexisting defect template" refers to an electronic document and/or computer program that may comprise parameters associated with identifying a defect or damage on an article. In some examples, a central controller (such as the central controller 118 as shown in FIGS. 1-2) may store the preexisting defect template in a data storage unit (such as the memory 404 as shown in FIG. 2).

For example, a preexisting defect template may be in the form of an artificial neural network that has been trained to extract image features associated with product damage or deformation. In this example, a central controller (such as the central controller 118) may provide the one or more differences to the artificial neural network as input, and the artificial neural network may provide an output indicating whether the differences can be classified as a visual defect indicator.

As another example, a preexisting defect template may be in the form of an image that the central controller (such as the central controller 118) has previously identified as showing product damage or deformation. In this example, the computer apparatus may extract features from the preexisting defect template, and may determine whether these features match the one or more differences as identified in the one or more images.

Additionally, or alternatively, a preexisting defect template may be in other forms, including, but not limited to, one or more pixel values, one or more image descriptors, and/or one or more metadata associated with images that the central controller (such as the central controller 118) has previously identified as showing product damage or deformation. Additionally, or alternatively, a preexisting defect template may be in the form of an ASCII text, a pointer, a memory address, or the like.

In some examples, a central controller (such as the central controller 118 as shown in FIGS. 1-2) may associate a visual defect indicator of an article with at least one unique characteristic or a unique product identifier of the article. For example, at described above in connection with at least block 506 of FIG. 5, the central controller may identify at least one unique characteristic of the at least one article. Prior to or subsequent to identifying the at least one unique characteristic, the central controller may identify the at least one visual defect indicator as described in connection with at least block 806.

In some examples, a central controller (such as the central controller 118) may update the preexisting defect template based on the visual defect indicators. Continuing from the above example of artificial neural network, after the central controller has classified the one or more differences as a visual defect indicator, the central controller may train the artificial neural network based on the one or more differences to improve its accuracy.

In some examples, the central controller may identify the visual defect indicator by at least processing the one or more images to detect one or more preexisting indicia on the at least one article. For example, the preexisting indicia may be a manufacture's warning label printed on the article. As an example, the warning label may indicate that the article is perishable. In this example, the central controller may detect one or more differences between images of the article. Based on the warning label and the one or more differences, the central controller may classify the one or more differences as a visual defect indicator.

The method 800 may include determining an indication based at least on the at least one visual defect indicator at block 808.

In some examples, the indication may be an electronic indication in the form of, for example, but not limited to, an ASCII text, a pointer, a memory address, or the like. In some examples, the indication may indicate and/or correspond to at least one of (1) a defect of the at least one article, and/or (2) a portion of the material handling system causing the defect. For example, the central controller 118 may determine an indication of at least one of a defect of the at least one article and/or the portion of the example material handling system 100 causing the defect based on the visual defect indicator as shown in FIGS. 1-2.

In some examples, a central controller (such as the central controller 118) may determine the defect of the at least one article based at least on the visual defect indicator. As described above, the visual defect indicator may be determined based at least in part on one or more differences between the images. In this example, the central controller may determine a section of the article that contains a defect based on the location of the one or more differences in the images.

Additionally, or alternatively, the central controller may determine a characteristic of the defect as part of the indication based on the visual defect indicator. For example, the indication may indicate that the packaging of the article is deformed.

In some examples, a central controller (such as the central controller 118) may determine the portion of the material handling system that causes the defect or damage on the at least one article based at least on the one or more images. For example, the central controller may determine the portion of the material handling system causing the defect based at least on the location(s) or portion(s) in the material handling system where the images were captured.

Continuing from the first/second images example above, if the first image is captured at a first portion of the material handling system and the second image is captured at a second portion of the material handling system, the central controller (such as the central controller 118) may determine a portion between the first portion and the second portion as the portion of the material handling system causing the defect or damage. For example, referring to FIG. 1, if the central controller 118 captures the first image at the merge portion 106 and the second image at the sorter portion 102, and identifies a visual defect indicator on the article, the central controller 118 may determine the induction portion 104 (which is between the merge portion 106 and the sorter portion 102) as the portion of the material handling system that may cause the defect.

In some examples, a central controller (such as the central controller 118) may perform one or more operations based on the indication.

For example, the central controller may modify at least one system variable associated with the material handling system based on the indication. As an example, the central controller may modify at least one system variable associated with at least the portion of the material handling system causing the defect. For example, if the central controller identifies the sorter portion as the portion causing the defect, the central controller may adjust the speed of the sorter portion to eliminate further damage to the articles.

Additionally, or alternatively, the central controller may modify at least one merge variable associated with a merge portion of the material handling system. For example, merge variable may include product spacing, speed, acceleration, merging mode, etc. associated with the merge portion 106 and/or systems upstream and/or downstream of the merge portion 106 as illustrated in FIG. 1. As an example, the central controller 118 may adjust the discharge control of the merge portion 106 to increase the space between articles being released to the induction portion 104 so that the articles will not be damaged due to article collision.

Additionally, or alternatively, the central controller may retrieve one or more product parameters (for example, based on the LIPID as described above), and adjust the at least one system variable based in part on the indication and the one or more product parameters. For example, the central controller may adjust the speed of an induction portion (for example, the induction portion 104 as described above in connection with FIG. 1) based on length and width of the product to maximize the throughput of the material handling system without causing article collision.

Additionally, or alternatively, the central controller may determine at least a sortation destination associated with the at least one article based on the indication. For example, referring back to FIG. 1, the central controller 118 may cause the sorter portion 102 to sort the article with defect to one of the destinations 108 that is specifically for receiving damaged articles (for example, a bin that may store damaged articles for manual inspection). In other words, the sorter portion 102 may identify all damaged articles and discharge them on a specific sortation destination. In some examples, the sortation destination associated with the at least one article is different from at least one sortation destination associated with other articles of the one or more articles. For example, the sorter portion 102 of FIG. 1 may separate damaged articles from other undamaged articles.

Additionally, or alternatively, the central controller may trigger a warning based on the indication. For example, the central controller may cause a speaker that is installed in proximity of the material handling system to output an audio alarm, indicating that one or more articles may contain defect or have been damaged.

It must be noted that, as used in this specification and the appended claims, the singular forms "a," "an" and "the" include plural referents unless the content clearly dictates otherwise.

References within the specification to "one embodiment," "an embodiment," "embodiments," or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

The invention claimed is:

1. A material handling system comprising a merge portion and a central controller that is configured to:

identify each of a plurality of characteristics associated with one or more articles based on one or more images, wherein each of the one or more articles comprises:

a first characteristic of the plurality of characteristics that corresponds to visually identifiable information associated with the one or more articles; and a second characteristic of the plurality of characteristics that corresponds to a barcode associated with the one or more articles, wherein the second characteristic is different from the first characteristic;

determine one or more product parameters associated with the one or more articles based at least in part on the plurality of characteristics and one or more unique product identifiers associated with the one or more articles; and adjust one or more merge variables associated with the merge portion based at least in part on the one or more product parameters.

2. The material handling system of claim 1, wherein the central controller is configured to:

determine one or more sortation destinations associated with the one or more articles based at least in part on the one or more product parameters.

3. The material handling system of claim 1, wherein the one or more product parameters comprise one or more of a weight parameter, a length parameter, a width parameter, or a coefficient of friction parameter.

4. The material handling system of claim 1, wherein the one or more merge variables comprise one or more of a product spacing variable, a speed variable, an acceleration variable, or a merging mode variable.

5. The material handling system of claim 1, further comprising a vision system configured to capture the one or more images of the one or more articles.

6. A method comprising:

identifying, by a central controller of a material handling system, each of a plurality of characteristics associated with one or more articles based on one or more images, wherein each of the one or more articles comprises:

a first characteristic of the plurality of characteristics that corresponds to visually identifiable information associated with the one or more articles; and a second characteristic of the plurality of characteristics that corresponds to a barcode associated with the one or more articles, wherein the second characteristic is different from the first characteristic;

determining, by the central controller, one or more product parameters associated with the one or more articles based at least in part on the plurality of characteristics and one or more unique product identifiers associated with the one or more articles; and adjusting, by the central controller, one or more merge variables associated with a merge portion of the material handling system based at least in part on the one or more product parameters.

7. The method of claim 6 further comprising:

determining, by the central controller, one or more sortation destinations associated with the one or more articles based at least in part on the one or more product parameters.

8. The method of claim 6, wherein the one or more product parameters comprise one or more of a weight parameter, a length parameter, a width parameter, or a coefficient of friction parameter.

9. The method of claim 6, wherein the one or more merge variables comprise one or more of a product spacing variable, a speed variable, an acceleration variable, or a merging mode variable.

10. The method of claim 6, further comprising:

capturing, by a vision system of the material handling system, the one or more images of the one or more articles.

11. A computer program product comprising at least one non-transitory computer-readable storage medium having computer-readable program code portions stored therein, the computer-readable program code portions comprising an executable portion configured to:

identify each of a plurality of characteristics associated with one or more articles based on one or more images of the one or more articles, wherein each of the one or more articles comprises:

a first characteristic of the plurality of characteristics that corresponds to visually identifiable information associated with the one or more articles; and a second characteristic of the plurality of characteristics that corresponds to a barcode associated with the one or more articles, wherein the second characteristic is different from the first characteristic;

determine one or more product parameters associated with the one or more articles based at least in part on the plurality of characteristics and one or more unique product identifiers associated with the one or more articles; and adjust one or more merge variables associated with a merge portion based at least in part on the one or more product parameters.

12. The computer program product of claim 11, wherein the computer-readable program code portions comprise the executable portion configured to:

determine one or more sortation destinations associated with the one or more articles based at least in part on the one or more product parameters.

13. The computer program product of claim 11, wherein the one or more product parameters comprise one or more of a weight parameter, a length parameter, a width parameter, or a coefficient of friction parameter.

14. The computer program product of claim 11, wherein the one or more merge variables comprise one or more of a product spacing variable, a speed variable, an acceleration variable, or a merging mode variable.

* * * * *